US012709526B2

(12) United States Patent
Chew et al.

(10) Patent No.: US 12,709,526 B2
(45) Date of Patent: Aug. 18, 2026

(54) CONTROL DEVICE FOR INDUSTRIAL VEHICLE, CONTROL SYSTEM FOR INDUSTRIAL VEHICLE, AND PROGRAM FOR CONTROL DEVICE FOR INDUSTRIAL VEHICLE

(71) Applicants: NATIONAL INSTITUTE OF ADVANCED INDUSTRIAL SCIENCE AND TECHNOLOGY, Tokyo (JP); KABUSHIKI KAISHA TOYOTA JIDOSHOKKI, Aichi (JP)

(72) Inventors: Jouh Yeong Chew, Tsukuba (JP); Mitsuru Kawamoto, Tsukuba (JP); Takashi Okuma, Tsukuba (JP); Eiichi Yoshida, Tsukuba (JP); Yukikazu Koide, Tsukuba (JP); Hironobu Okamoto, Tsukuba (JP)

(73) Assignees: NATIONAL INSTITUTE OF ADVANCED INDUSTRIAL SCIENCE AND TECHNOLOGY, Tokyo (JP); KABUSHIKI KAISHA TOYOTA JIDOSHOKKI, Kariya (JP)

( * ) Notice: Subject to any disclaimer, the term of this patent is extended or adjusted under 35 U.S.C. 154(b) by 282 days.

(21) Appl. No.: 18/298,611

(22) Filed: Apr. 11, 2023

(65) Prior Publication Data

US 2023/0331527 A1 Oct. 19, 2023

(30) Foreign Application Priority Data

Apr. 15, 2022 (JP) ................................ 2022-067698

(51) Int. Cl.
*B66F 9/06* (2006.01)
*B66F 9/075* (2006.01)
(Continued)

(52) U.S. Cl.
CPC ............ *B66F 9/063* (2013.01); *B66F 9/0755* (2013.01); *G05D 1/0088* (2013.01); *G06T 7/0004* (2013.01); *G05D 1/0038* (2013.01)

(58) Field of Classification Search
CPC ..... B66F 9/063; B66F 9/0755; G05D 1/0088; G05D 1/0038; G05D 1/86; G05D 2105/28;
(Continued)

(56) References Cited

U.S. PATENT DOCUMENTS

2018/0307227 A1* 10/2018 Buttolo ................ G05D 1/0061
2020/0073399 A1* 3/2020 Tateno ................ G05D 1/0251
(Continued)

FOREIGN PATENT DOCUMENTS

CN 107031629 A 8/2017
CN 112784799 A 5/2021
(Continued)

OTHER PUBLICATIONS

M. Kawamoto, K. Okayama, T. Okuma, N. Kato and T. Kurata, "Work Analysis Using Human Operating Data Based on a State Transition Model," 2018, 2018 IEEE International Symposium on Circuits and Systems (ISCAS), Florence, Italy, pp. 1-5 (Year: 2018).*
(Continued)

*Primary Examiner* — Anne Marie Antonucci
*Assistant Examiner* — Nicholas Patrick Langhorne
(74) *Attorney, Agent, or Firm* — Sughrue Mion, PLLC

(57) ABSTRACT

A control device for an industrial vehicle is a control device for an industrial vehicle for estimating a working state of the industrial vehicle, which includes a working state estimation unit that estimates the working state of the industrial vehicle, and the working state estimation unit receives operation information regarding an operation state with respect to the
(Continued)

industrial vehicle and photographing information obtained by photographing a package, performs a determination as to whether or not a packing form of the package is in an abnormal state, and outputs the working state.

6 Claims, 7 Drawing Sheets

(51) Int. Cl.
*G05D 1/00* (2024.01)
*G06T 7/00* (2017.01)

(58) Field of Classification Search
CPC ........... G05D 2107/70; G05D 2109/10; G05D 2111/10; G05D 1/243; G05D 1/661; G06T 7/0004; G06T 2207/20081; G06V 20/52; G06V 2201/06; G06V 10/82; G06Q 10/08
See application file for complete search history.

(56) References Cited

U.S. PATENT DOCUMENTS

2020/0377351 A1 12/2020 Uchimura et al.
2021/0035056 A1 2/2021 Jacobus et al.
2021/0087033 A1 3/2021 Kimura et al.
2021/0133666 A1 5/2021 Eckman et al.
2022/0067960 A1* 3/2022 Guo .......................... G06T 7/62
2022/0089419 A1 3/2022 Kim et al.

FOREIGN PATENT DOCUMENTS

EP 3805888 A1 * 4/2021 ............. B66F 9/063
EP 3960692 A1 3/2022
JP 2016-9316 A 1/2016
JP 2019-189435 A 10/2019
JP 2020-37463 A 3/2020
JP 2020-37464 A 3/2020
JP 2021-47825 A 3/2021
JP 2021-98596 A 7/2021
JP 2021-157468 A 10/2021
JP 2021-170233 A 10/2021
JP 2022-15592 A 1/2022

OTHER PUBLICATIONS

Misra et al., “Cross-stitch Networks for Multi-task Learning”, CVPR, 2016, pp. 3994-4003, Retrieved from URL: https://openaccess.thecvi.com/content_cvpr_2016/papers/Misra_Cross-Stitch_Networks_for_CVPF_2016_paper.pdf.
Mok et al., “Pallet Recognition with Multi-Task Learning for Automated Guided Vehicles”, Applied Sciences, 2021, vol. 11, No. 11808, pp. 1-13.

* cited by examiner

Fig.3A

| | NoLoad | Load |
|---|---|---|
| Stop | (1) | (8) |
| Move fwd | (2) | (9) |
| Approach | (3) | (10) |
| Adjust heading | (4) | (11) |
| Load/Unload | (5) | (12) |
| Retreat | (13) | (6) |
| Move reverse | (14) | (7) |
| Anomaly | (15) | |

Fig.3B

23
WORKING STATE ACQUISITION UNIT
30
WORKING STATE ESTIMATION UNIT
MACHINE LEARNING MODEL
M1
WORKING STATE x(t)
FEATURE VECTOR v(t)
31
FEATURE VECTOR ACQUISITION UNIT
MACHINE LEARNING MODELS
M2
OPERATION INFORMATION U(T)
· ACCELERATOR OPERATION AMOUNT
· TIRE ANGLE
· LIFT OPERATION AMOUNT
· REACH OPERATION AMOUNT
· TILT OPERATION AMOUNT
IMAGE I(t)

45E
E3
40E
45D
45C
E2
40D
40C
45B
45F
40B
E1
45A
40A

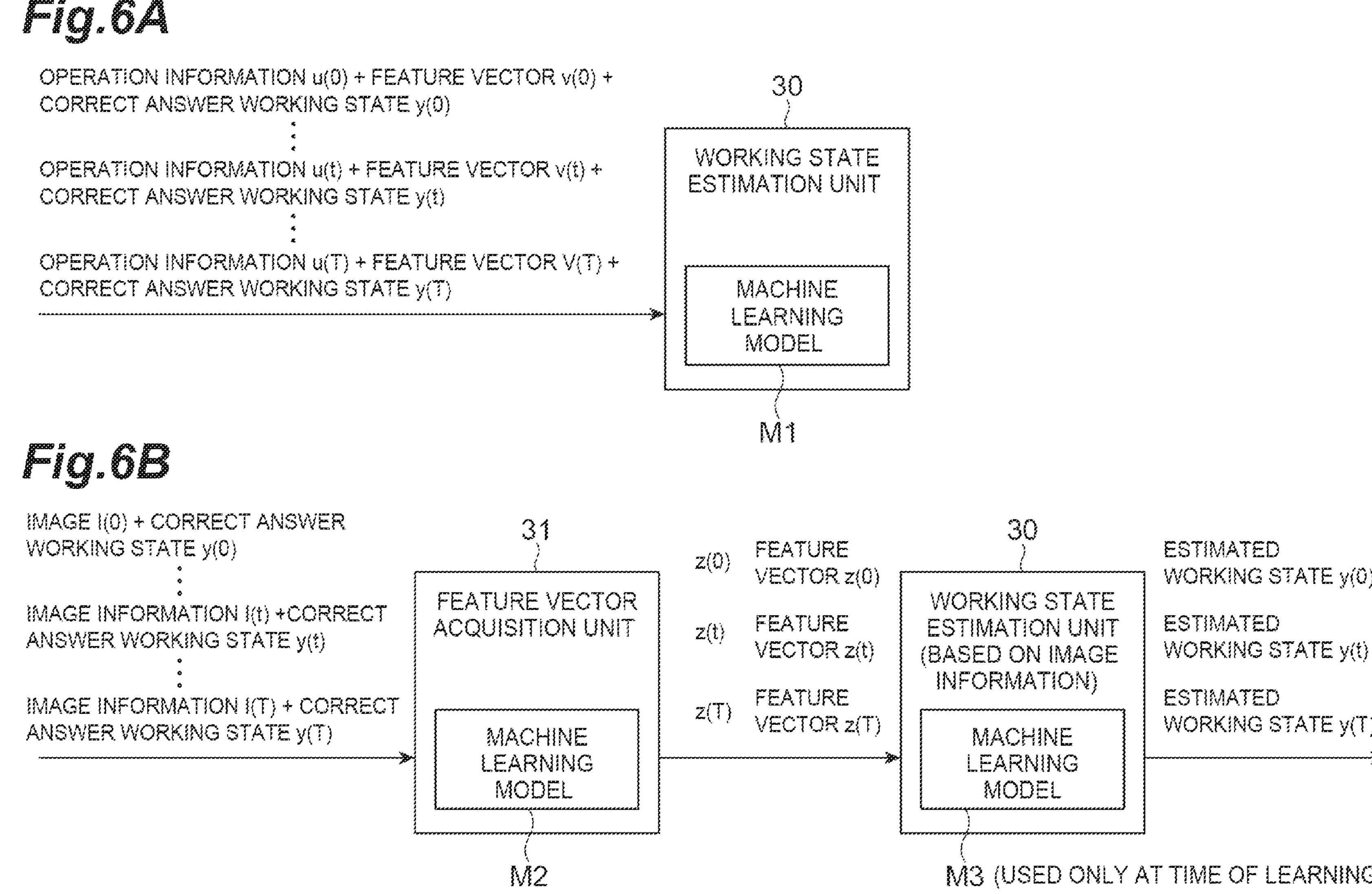
Fig.6A
OPERATION INFORMATION u(0) + FEATURE VECTOR v(0) + CORRECT ANSWER WORKING STATE y(0)
OPERATION INFORMATION u(t) + FEATURE VECTOR v(t) + CORRECT ANSWER WORKING STATE y(t)
OPERATION INFORMATION u(T) + FEATURE VECTOR V(T) + CORRECT ANSWER WORKING STATE y(T)
30
WORKING STATE ESTIMATION UNIT
MACHINE LEARNING MODEL
M1
Fig.6B
IMAGE I(0) + CORRECT ANSWER WORKING STATE y(0)
IMAGE INFORMATION I(t) +CORRECT ANSWER WORKING STATE y(t)
IMAGE INFORMATION I(T) + CORRECT ANSWER WORKING STATE y(T)
31
FEATURE VECTOR ACQUISITION UNIT
MACHINE LEARNING MODEL
M2
z(0) FEATURE VECTOR z(0)
z(t) FEATURE VECTOR z(t)
z(T) FEATURE VECTOR z(T)
30
WORKING STATE ESTIMATION UNIT (BASED ON IMAGE INFORMATION)
MACHINE LEARNING MODEL
M3 (USED ONLY AT TIME OF LEARNING)
ESTIMATED WORKING STATE y(0)
ESTIMATED WORKING STATE y(t)
ESTIMATED WORKING STATE y(T)

CONTROL DEVICE FOR INDUSTRIAL VEHICLE, CONTROL SYSTEM FOR INDUSTRIAL VEHICLE, AND PROGRAM FOR CONTROL DEVICE FOR INDUSTRIAL VEHICLE

CROSS REFERENCE TO RELATED APPLICATIONS

This application claims priority to Japanese Patent Application No. 2022-067698 filed on Apr. 15, 2022, the entire contents of which are incorporated by reference herein.

TECHNICAL FIELD

The present disclosure relates to a control device for an industrial vehicle, a control system for an industrial vehicle, and a program for a control device for an industrial vehicle.

BACKGROUND

As a control device for industrial vehicles, for example, a device described in Japanese Unexamined Patent Application No. 2019-189435 is known. The control device for an industrial vehicle described in Japanese Unexamined Patent Application No. 2019-189435 estimates a working state of the industrial vehicle on the basis of operation information with respect to the industrial vehicle, and controls the industrial vehicle on the basis of an estimation result of the working state.

SUMMARY

Here, a package that is a loading and unloading target of an industrial vehicle may be in an abnormal state in which a packing form is not suitable for loading and unloading. For example, when a package is not appropriately loaded on a pallet, the package may not be able to be loaded and unloaded appropriately in some cases. However, since the above-described control device estimates the working state of the industrial vehicle on the basis of the operation information, the control device cannot detect a packing form of the package. Therefore, the above-described control device has a problem that the control device cannot perform estimation of a working state, including detection of an abnormality in the packing form. Therefore, a working state, including an abnormal state of a packing form, is required to be more appropriately estimated.

An object of the present disclosure is to provide a control device for an industrial vehicle, a control system for an industrial vehicle, and a program for a control device for an industrial vehicle capable of estimating a working state of an industrial vehicle more appropriately.

A control device for an industrial vehicle according to an aspect of the present disclosure is a control device for an industrial vehicle for estimating a working state of the industrial vehicle, the control device including: a working state estimation unit configured to estimate the working state of the industrial vehicle, wherein the working state estimation unit receives operation information regarding an operation state with respect to the industrial vehicle and photographing information obtained by photographing a package, performs a determination as to whether or not a packing form of the package is in an abnormal state, and outputs the working state.

The control device for an industrial vehicle includes the working state estimation unit that estimates the working state of the industrial vehicle. Here, the working state estimation unit receives not only the operation information regarding the operation state with respect to the industrial vehicle, but also the photographing information obtained by photographing the package. The working state estimation unit can determine whether the packing form of the package is normal or abnormal on the basis of not only the operation of the industrial vehicle, but also the imaging information. Therefore, the working state estimation unit determines whether or not the packing form is in an abnormal state, and outputs the working state. This makes it possible for the working state estimation unit to estimate the working state, including not only the state of the industrial vehicle itself but also the abnormal state of the packing form. In this way, it is possible to estimate the working state of the industrial vehicle more appropriately.

The working state estimation unit may be capable of estimating the working state on the basis of a working state estimation model set by machine learning, and may output the working state on the basis of the operation information and the photographing information. Since the working state estimation model is set by machine learning on the basis of actual past data, it is possible to accurately estimate the working state, including the abnormal state of the packing form.

The operation information may include at least one of an accelerator operation amount, a steering angle, a lift operation amount, a reach operation amount, and a tilt operation amount. These parameters are parameters that reflect an intention of an operator in the industrial vehicle. The working state estimation unit can perform estimation of an appropriate working state by using such parameters as the operation information.

The control device for an industrial vehicle may further include: a feature vector acquisition unit configured to acquire a feature vector of the image from an image obtained by photographing the package, by using machine learning, the feature vector acquisition unit may use a CNN as a machine learning model, and the working state estimation unit may estimate the working state on the basis of the feature vector acquired by the feature vector acquisition unit. The feature vector acquisition unit can reduce an amount of information to be output to the working state estimation unit by indicating the photographing information using the feature vector. Further, the feature vector acquisition unit can use the CNN as a machine learning model to acquire a feature vector that suitably reflects the abnormal state of the packing form on the basis of past performance.

According to the present disclosure, it is possible to provide a control device for an industrial vehicle, a control system for an industrial vehicle, and a program for a control device for an industrial vehicle capable of more appropriately estimating a working state of an industrial vehicle.

BRIEF DESCRIPTION OF THE DRAWINGS

FIGS. 3A and 3B are diagrams illustrating a working state of the forklift.

FIGS. 6A and 6B are diagrams illustrating a state in which a working state estimation unit and a feature vector acquisition unit perform machine learning.

DETAILED DESCRIPTION

Figure 1:
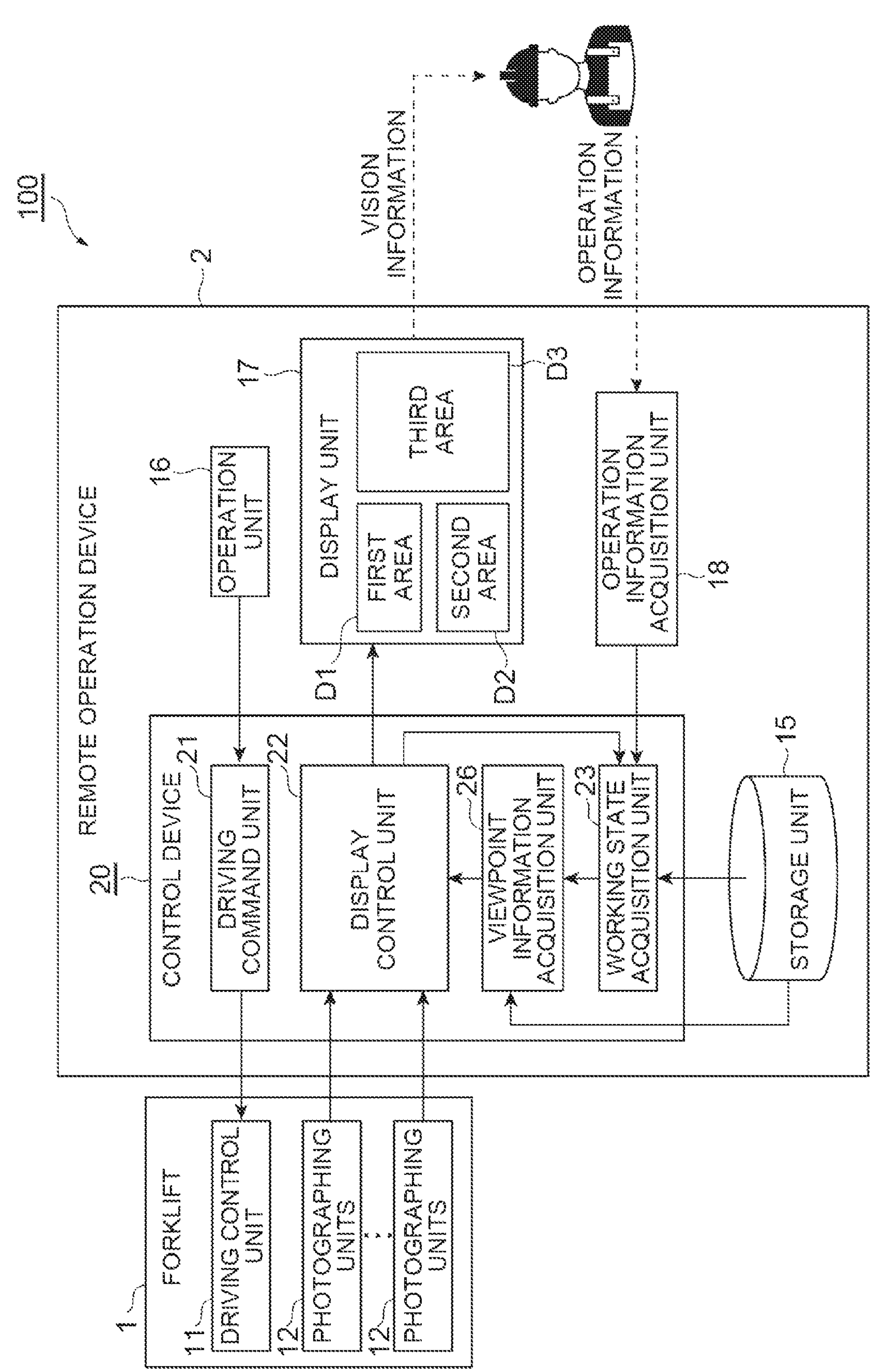
FIG. 1 is a block diagram illustrating a driving assistance system according to an embodiment of the present disclosure.

Hereinafter, preferred embodiments of the present disclosure will be described in detail with reference to the drawings. In the drawings, the same or equivalent elements are denoted by the same reference numerals, and overlapping description will be omitted.

FIG. 1 is a block diagram illustrating a driving assistance system 100 (a control system for an industrial vehicle) including a control device 20 according to an embodiment of the present disclosure. The driving assistance system 100 is a system for remotely operating an industrial vehicle. As illustrated in FIG. 1, the driving assistance system 100 includes a forklift 1 (industrial vehicle) and a remote operation device 2.

Figure 2A:
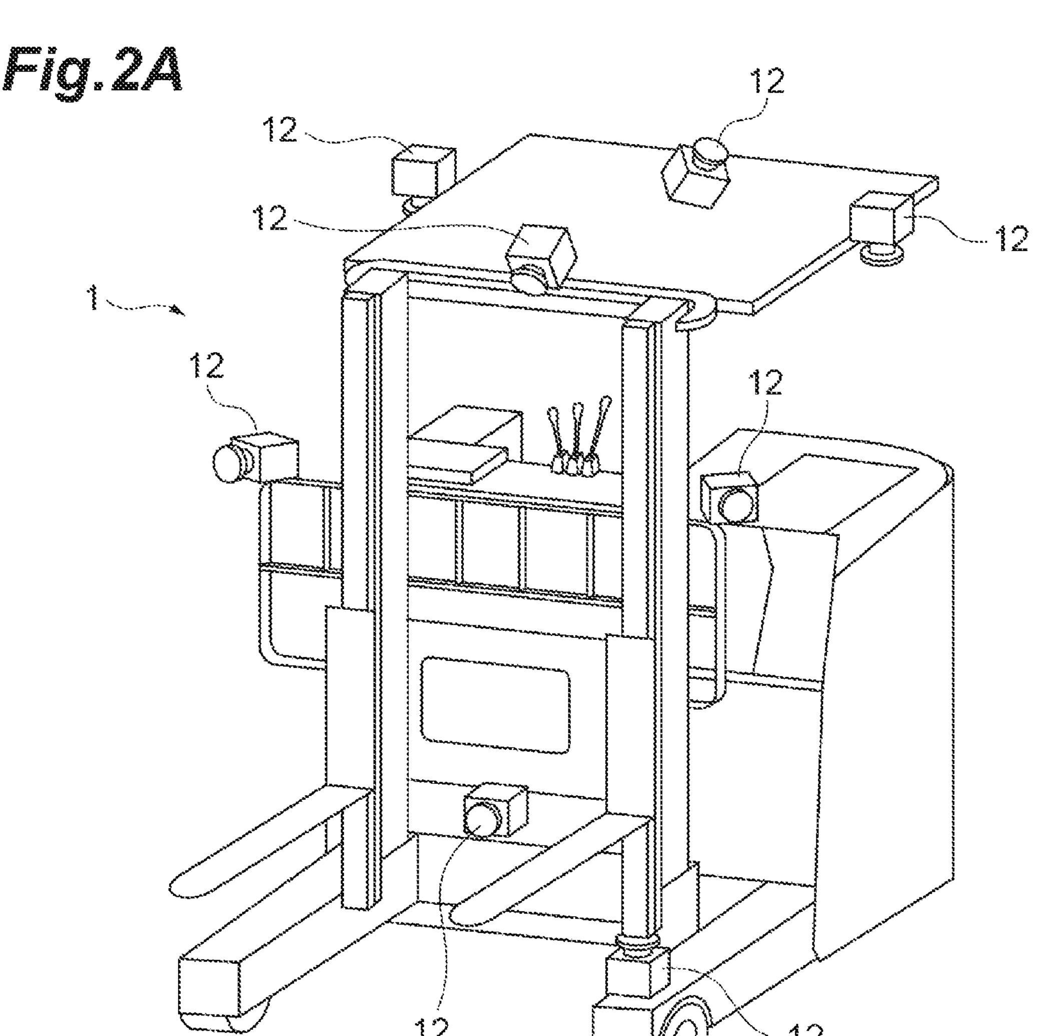
FIG. 2A is a perspective view illustrating a state in which photographing units are attached to a forklift.
Figure 2B:
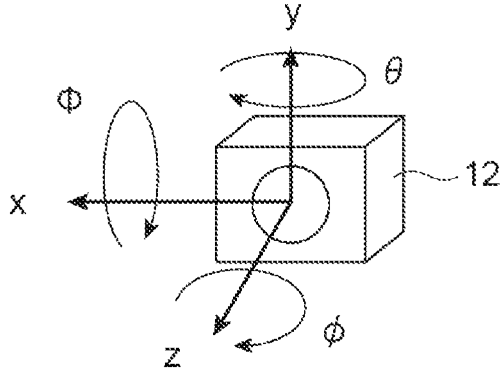
FIG. 2B is a schematic diagram illustrating an angle of the photographing unit.

The forklift 1 includes a driving control unit 11 and a plurality of photographing units 12. The driving control unit 11 receives a command signal from the remote operation device 2 and performs driving control and steering control on the basis of the command signal. The plurality of photographing units 12 are provided at respective portions of the forklift 1 and photograph a surrounding environment of the forklift 1. The photographing unit 12 acquires a captured video as assistance information used for work assistance, and transmits the captured video to a display control unit 22 to be described below. An example of attachment positions of the plurality of photographing units 12 is illustrated in FIG. 2A. The photographing units 12 are provided at a front end of a vehicle body of the forklift 1, end portions in a width direction, a ceiling, and the like. When XYZ coordinates are set as illustrated in FIG. 2B, the photographing unit 12 at each location may be installed in a state in which the photographing unit 12 is tilted with respect to each of X, Y, and Z axes. In FIG. 2A, the photographing units 12 are provided at eight locations to acquire videos of different locations.

As illustrated in FIG. 1, the remote operation device 2 includes a storage unit 15, an operation unit 16, a display unit 17, an operation information acquisition unit 18, and a control device 20. The storage unit 15 is a device that stores various types of information. The operation unit 16 is a user interface for inputting an operation for an operator to remotely operate the forklift 1. The display unit 17 is a user interface for outputting a video. The display unit 17 has a first area D1, a second area D2, and a third area D3 capable of outputting different videos.

The operation information acquisition unit 18 acquires operation information when the operator is operating an operation target (here, the operation unit 16). The operation information acquisition unit 18 is configured of, for example, a sensor provided on an operation lever of the operation unit 16 or means for detecting operation content on the basis of a signal indicating operation content of the operation unit 16.

The control device 20 is a control unit that controls the entire remote operation device 2. The control device 20 includes an electronic control unit (ECU) that performs overall management of the remote operation device 2. The ECU is an electronic control unit including a central processing unit (CPU), a read only memory (ROM), a random access memory (RAM), a controller area network (CAN), a communication circuit, and the like. In the ECU, for example, a program stored in the ROM is loaded into the RAM, and the program loaded into the RANI is executed by the CPU, thereby realizing various functions. The control device 20 includes a driving command unit 21, the display control unit 22, a working state acquisition unit 23, and a viewpoint information acquisition unit 26.

The driving command unit 21 is a unit that generates a command signal based on the operation input by the operation unit 16 and transmits the command signal to the driving control unit 11.

The display control unit 22 is a unit that controls display content of the display unit 17. The display control unit 22 causes the display unit 17 to display information for assisting the operator with remote operation work. The display control unit 22 controls display content of the first area D1, the second area D2, and the third area D3 of the display unit 17 using information in a database of the storage unit 15. Further, the display control unit 22 transmits a video acquired from the photographing unit 12 to the working state acquisition unit 23.

The display control unit 22 selects a video to be displayed on the display unit 17 on the basis of viewpoint information acquired by the viewpoint information acquisition unit 26. The first area D1 and the second area D2 are large screen portions in which a specific video is displayed in a large size, and a video of the photographing unit 12 selected by the display control unit 22 from among the videos of the plurality of photographing units 12 is displayed. The third area D3 corresponds to a small screen portion in which a plurality of videos are displayed in a small size, and displays the videos from all the photographing units 12 on the forklift 1 as environment information for checking surroundings (see also FIG. 4).

Figures 3A, 3B:
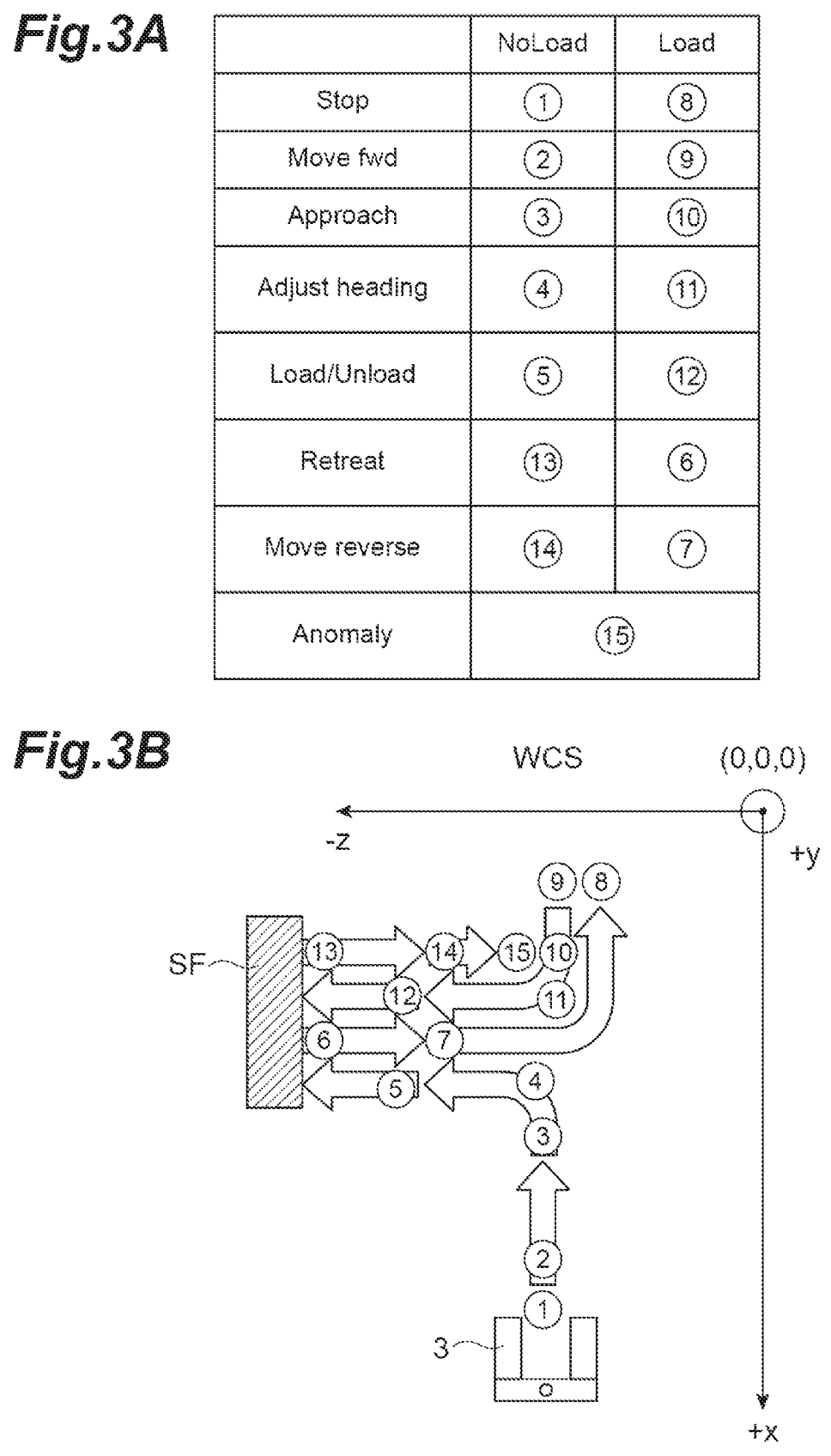

For example, FIG. 3A illustrates a table defining a working state of the forklift 1. Here, as examples of the working state, a total of 14 working states including a state with a package (Load) and a state with no package (No Load) divided among seven states regarding traveling of the forklift 1, such as "stop (Stop)," "move forward (Move fwd)," "approach a shelf (Approach)," "adjust (Adjust heading)," "load/unload (Load/Unload)," "travel preparation (Retreat)" and "move backward (Move reverse)," and package picking-up/unloading work are defined. The traveling of the forklift 1 corresponds to "stop (Stop)", "move forward (Move fwd),", "approach a shelf (Approach)," "travel preparation (Retreat)" and "move backward (Move reverse)," and the package picking-up/unloading work corresponds to "adjust (Adjust heading)" and "load/unload (Load/Unload) ." The definition or number of respective working states is not limited to the foregoing and can be changed appropriately. Further, the working state may be defined only by something regarding the traveling of the forklift 1 (industrial vehicle). Further, a working state "anomaly" indicating that the packing form of the package is in an abnormal state is set regardless of the presence or absence of a package. Thus, a total of 15 working states are defined in FIG. 3A. FIG. 3B is a schematic diagram illustrating respective working states when the forklift 1 picks up and unloads a package from a shelf SF. A state transition from any of working states 1 to 14 illustrated in FIGS. 3A and 3B to working state 15, which is an abnormal state of a packing form, is possible. In the database of the storage unit 15, each working state is associated with the photographing unit 12 capable of capturing a location to be checked in the working state. Therefore, the display control unit 22 can display a video of a particular location to be checked with large screens in the first area D1 and the second area D2 according to the working state of the forklift 1 operated by the operator. The video displayed on the display unit 17 under the control of the display control unit 22 for driving assistance may be referred to as a "driving assistance video."

There is an individual difference in an appropriate switching timing of the driving assistance video depending on the operator. Further, when the working state of the forklift 1 transitions, the video to be displayed on the display unit 17 is switched. In view of the circumstances, the working state acquisition unit 23 and the viewpoint information acquisition unit 26 perform processing for making the driving assistance video suitable for an individual operator and corresponding to a state transition of the working state.

The working state acquisition unit 23 acquires the working state of the forklift 1. The working state acquisition unit 23 acquires the working state on the basis of the operation information acquired by the operation information acquisition unit 18. The working state acquisition unit 23 acquires the working state using a working state estimation model in which an estimation index such as a transition condition or a transition threshold at the time of state transition to each working state has been set. The working state acquisition unit 23 may acquire the working state estimation model stored in the storage unit 15. Details of the working state acquisition unit 23 will be described below. The working state acquisition unit 23 transmits the acquired working state to the viewpoint information acquisition unit 26.

The viewpoint information acquisition unit 26 acquires a viewpoint of the operator on the basis of the working state acquired by the working state acquisition unit 23. Here, the storage unit 15 includes the database in which the working state of the forklift 1 is associated to line-of-sight information based on a line-of-sight of the operator. Therefore, the viewpoint information acquisition unit 26 collates the working state of the forklift 1 with the database to acquire the line-of-sight information corresponding to the working state. The viewpoint information acquisition unit 26 transmits the acquired viewpoint information to the display control unit 22. This makes it possible for the display control unit 22 to control the video displayed on the display unit 17 on the basis of the viewpoint information, and to display an optimal video for the working state of the forklift 1 and the individual operator.

Figure 4:
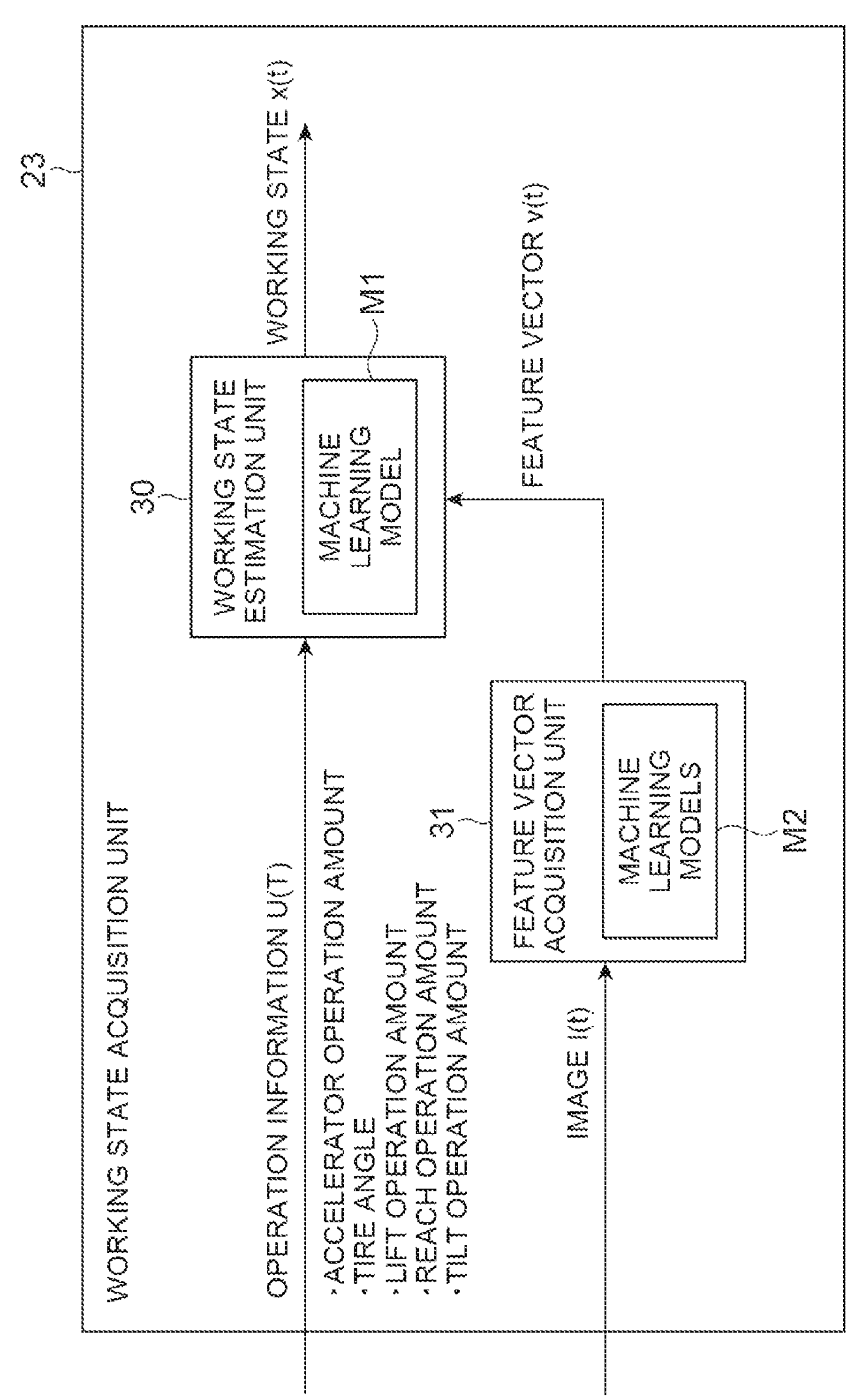
FIG. 4 is a block diagram of a working state acquisition unit.

Next, a detailed configuration of the working state acquisition unit 23 will be described with reference to FIG. 4. FIG. 4 is a block diagram illustrating a configuration of the working state acquisition unit 23. As illustrated in FIG. 4, the working state acquisition unit 23 includes a working state estimation unit 30 and a feature vector acquisition unit 31.

The working state estimation unit 30 estimates the working state of the forklift 1 by using machine learning. The working state estimation unit 30 receives current operation information u(t) and a current feature vector v(t) that is current photographing information, performs a determination as to whether the packing form is in an abnormal state on the basis of a learning result, and outputs a current working state x(t). The working state estimation unit 30 includes a machine learning model M1.

Classification of "1" to "15" illustrated in FIG. 3A is used as the working state. The operation information includes at least one of an accelerator operation amount, a steering angle, a lift operation amount, a reach operation amount, and a tilt operation amount. The accelerator operation amount is a parameter indicating an amount of an operation with respect to an accelerator of the forklift 1, and indicates that the vehicle speed of the forklift 1 increases as the accelerator operation amount increases. The steering angle is a parameter indicating a turning angle of a tire of the forklift 1, and indicates that the forklift 1 makes a larger turn as the steering angle increases. The lift operation amount is a parameter indicating an amount of operation for lifting a fork of the forklift 1, and indicates that the fork is more greatly lifted as the lift operation amount increases. The reach operation amount is a parameter indicating an amount of operation for extending the fork of the forklift 1 forward, and indicates that a forward movement of the fork is larger as the reach operation amount increases. The tilt operation amount is a parameter indicating an amount of operation for tilting the fork of the forklift 1, and indicates that the fork tilts more greatly as the tilt operation amount increases.

The working state estimation unit 30 collates the working state estimation model in which the estimation index such as the transition condition or the transition threshold at the time of state transition to each working state has been set, with the input current operation information u(t) to estimate and output the current working state x(t). In the working state estimation model, a transition from a certain working state to another working state occurring when a certain parameter in the above-described operation information increases (or decreases) to what degree is set. For example, the forklift 1 is making a large turn in "Adjust heading" of "working state 4", and the forklift 1 travels slowly at a low vehicle speed in "Load" in "working state 5", as illustrated in FIG. 3B. Therefore, the working state estimation unit 30 may estimate that transition from "working state 4 to "working state 5" has occurred when each parameter falls below a predetermined threshold value from a state in which the accelerator operation amount is large and the steering angle is large. In such a working state estimation model, an optimal estimation index for the operator is set by machine learning on the basis of past driving performance of the operator. An individual working state estimation model may be created for each operator, or a working state estimation model not limited to individual operators may be created. The working state estimation model is stored in the storage unit 15, and the working state estimation unit 30 acquires an appropriate working state estimation model corresponding to the operator from the storage unit 15 at a necessary timing. Further, the working state estimation unit 30 considers the feature vector v(t) input from the feature vector acquisition unit 31, thereby estimating and outputting the current working state x(t), including the abnormal state of the packing form of the package (working state 15). The abnormal state of the packing form will be described below.

The feature vector acquisition unit 31 acquires the feature vector of the image from an image obtained by photographing the package, by using machine learning. The feature vector acquisition unit 31 acquires a current image I(t) captured by the photographing unit 12 of the forklift 1 via the display control unit 22 (see FIG. 1). The feature vector acquisition unit 31 acquires the image I(t) in which the packing form of the package, such as a forward side of the forklift 1, appears among images of the plurality of photographing unit 12. The feature vector acquisition unit 31 receives the current image I(t) and outputs the feature vector v(t) of the current image to the working state estimation unit 30 on the basis of a learning result. The feature vector acquisition unit 31 has a machine learning model M2.

The feature vector acquisition unit 31 collates an extraction model capable of extracting a feature vector (for example, 1024 dimensions) effective for estimating a working state from an image (for example, 1920×1080 dimensions) with the input current image I(t) to perform image analysis, thereby acquiring and outputting the feature vector v(t) of the current image I(t). For such an extraction model, an optimal extraction method is set by machine learning on the basis of the past driving performance. The extraction model is stored in the storage unit 15, and the feature vector acquisition unit 31 acquires the extraction model from the storage unit 15 at a necessary timing.

Figure 5:
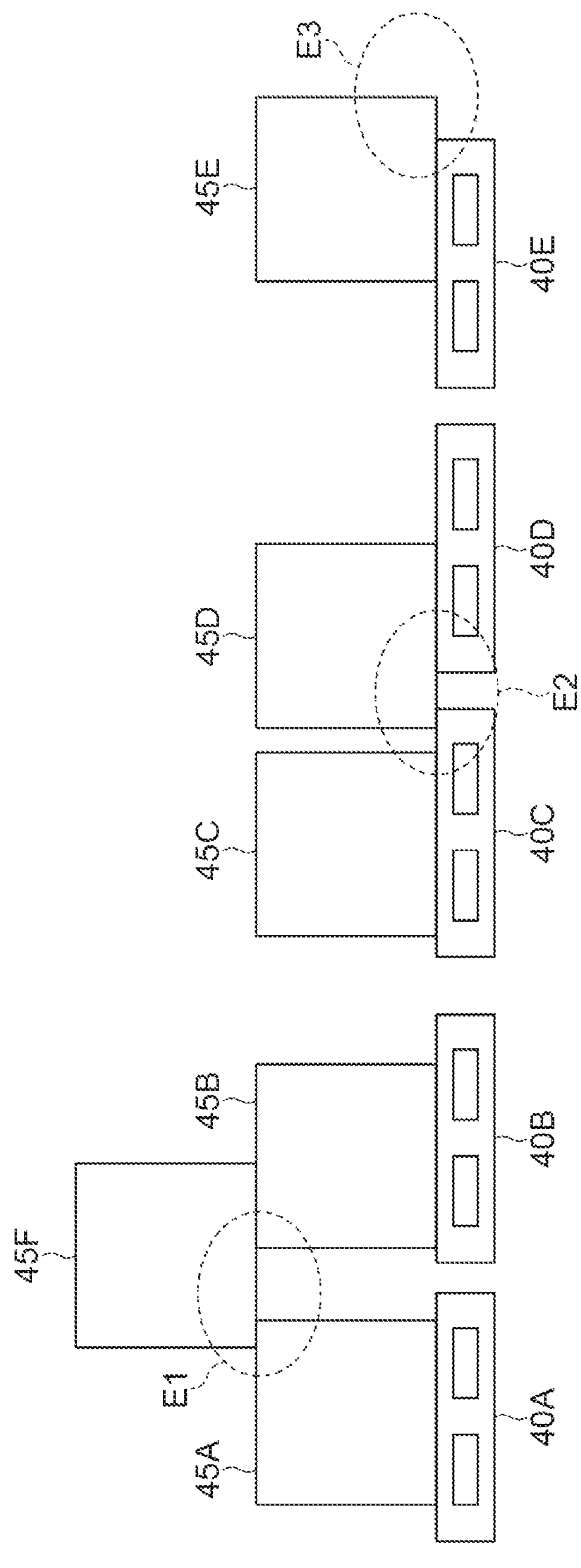
FIG. 5 is a diagram illustrating abnormal states of a packing form.

A feature vector suitable for estimating that the packing form of the package is in an abnormal state will be described with reference to FIG. 5. As illustrated in FIG. 5, a package 45F is disposed to be bridged on an upper surface of a package 45A on a pallet 40A and an upper surface of a package 45B on a pallet 40B. In the case of such a packing form, when the forklift 1 lifts the pallet 40A or the pallet 40B, the package 45F is likely to collapse. Therefore, it is preferable to extract a feature vector at a location indicating a state in which the plurality of packages 45 overlap, as indicated by an area E1. Further, a package 45D on a pallet 40D is approaching a pallet 40C. In such a packing form, when the forklift 1 lifts the pallet 40C, the package 45D is likely to collapse. Alternatively, when the forklift 1 lifts the pallet 40D, the package 45D is likely to collapse. Therefore, it is preferable to extract a feature vector at a location indicating a state in which the package 45 on a certain pallet overlaps the other pallet 40, as indicated by an area E2. Further, a package 45E on a pallet 40E protrudes from the pallet 40E. In such a packing form, when the forklift 1 lifts the pallet 40E, the package 45E is likely to fall. Further, when the forklift 1 tries to unload the other pallet 40 next to the pallet 40E, the pallet 40 is likely to collide with the package 45E. Therefore, it is preferable to extract a feature vector at a location indicating specific protrusion of the package 45 from the pallet 40, as indicated by an area E3.

FIG. 5 merely illustrates examples of an abnormal state of the packing form, and a feature vector enabling other abnormal states to be detected may be extracted. For example, when a package being transported by the forklift 1 is disposed with a large deviation from a pallet or protrudes from the pallet, a feature vector may be extracted as the abnormal state of the packing form. Further, a target object on which a package is disposed is not limited to the pallet as illustrated in FIG. 5. For example, an abnormal state of a packing form when a basket pallet having a box-shaped basket with four legs is used may be extracted. For example, it is assumed that a state in which four legs of an upper basket pallet are fitted into four fitting portions on the upper end side of a lower basket pallet is a normal state. On the other hand, for example, when any one leg (for example, one of the four legs) is not fitted to the fitting portion (a falling state) or fitting is insufficient due to, for example, distortion of the basket pallet, a packing form is in an abnormal state and a feature vector may be extracted.

The working state estimation unit 30 can estimate the working state on the basis of the feature vector v(t) acquired by the feature vector acquisition unit 31. The working state estimation unit 30 may determine the abnormal state of the packing form on the basis of only a result of the input feature vector v(t) regardless of which of "working state 1" to "working state 14" the forklift 1 is currently in (see FIG. 3A). For example, when a portion such as the area E1, E2, or E3 in FIG. 5 is present in the input feature vector v(t), the working state estimation unit 30 may estimate that the packing form of "working state 15" is in an abnormal state regardless of which of "working state 1" to "working state 14" the forklift 1 is in. In this case, at a point in time when the feature vector acquisition unit 31 extracts the portion such as the area E1, E2, or E3 from the image, the feature vector acquisition unit 31 may acquire this as the abnormal state of a packing form, and output a determination result indicating that "the packing form is in an abnormal state" to the working state estimation unit 30 as imaging information. The working state estimation unit 30 may determine that the packing form is in an abnormal state, on the basis of the imaging information indicating the determination result from the feature vector acquisition unit 31.

Further, the working state estimation unit 30 may determine the abnormal state of the packing form in consideration of both which of "working state 1" to "working state 14" the current forklift 1 is (FIG. 3A) and the input feature vector v(t). For example, the working state estimation unit 30 may not determine that a state of the packing form is abnormal, depending on which of "working state 1" to "working state 14" the forklift 1 is, even when the portion such as the area E1, E2, or E3 in FIG. 5 is present in the input feature vector v(t). For example, even when the portion such as the area E1, E2, or E3 is present in the image, the working state estimation unit 30 may not determine that the packing form is in an abnormal state when the forklift 1 tries to lift a pallet 40 different from the pallets 40A to 40E. Further, in the case of the pallet 40E, transportation by the forklift 1 is permitted even when the package 45E is slightly shifted, but collision between the other pallet 40 and the package 45E is not permitted in some cases. In this case, when the working state of the forklift 1 is "working state 5" in which the pallet 40E is lifted, the working state estimation unit 30 does not determine that the packing form is in the abnormal state even when the area E3 is extracted, and estimates that the working state is the "working state 5". On the other hand, when the working state of the forklift 1 is "working state 12" in which another pallet is loaded next to the pallet 40E, the working state estimation unit 30 determines that the packing form is in an abnormal state and estimates that the working state is "working state 15" when the area E3 is extracted.

FIG. 6A is a block diagram illustrating a state of the working state estimation unit 30 at the time of learning. As illustrated in FIG. 6A, the working state estimation unit 30 performs machine learning according to an input of operation information regarding an operation state with respect to the forklift 1, an input of a feature vector of an image, and an input of correct answer data of the working state. Processing of the machine learning illustrated in FIG. 6A may be performed in advance in a stage before an actual remote operation of the forklift 1 is performed. Data prepared in advance may be used as the operation information, the feature vector, and the correct answer data. For example, driving of the forklift 1 is actually performed in a laboratory or the like, and acquisition of the data is performed in a state in which the operation information and the feature vector of the image at a certain time are associated with an actual working state at that time. The actual working state in this case becomes the correct answer data.

The working state estimation unit 30 may use long short term memory (LSTM) as the machine learning model M1. In this case, the working state estimation unit 30 may perform the machine learning using operation information acquired for each time series and a feature vector of the image acquired for each time series as learning data. The operation information and the feature vector acquired for each time series consist of, for example, a data group of "the operation information u(t), the feature vector v(t), and a correct answer working state y(t)" acquired at predetermined intervals from "time 0" to "time T". The working state estimation unit 30 may use a recurrent neural network (RNN) capable of coping with operation information acquired in time series, as the machine learning model M1. Further, the machine learning model M1 is not limited to the CNN as long as the working state estimation unit 30 can acquire.

FIG. 6B is a block diagram illustrating a state of the feature vector acquisition unit 31 at the time of learning. As illustrated in FIG. 6B, the feature vector acquisition unit 31 outputs the feature vector to the working state estimation unit 30 according to an input of an image of a package that is a loading and unloading target of the forklift 1 and an input of a correct answer working state corresponding to the image. The working state estimation unit 30 outputs an estimated working state on the basis of the feature vector. The feature vector acquisition unit 31 constructs machine learning models M2 and M3 so that an error between the correct answer working state (y(t)) and the estimated working state (y'(t)) decreases. The machine learning model M3 of the working state estimation unit 30 is a model that is used only at the time of learning. When the learning is completed, the feature vector acquisition unit 31 picks up the machine learning model M2, which is used in the working state acquisition unit 23. Processing of the machine learning illustrated in FIG. 6B may be performed in advance in a stage before an actual remote operation of the forklift 1 is performed. Data prepared in advance is used as the image and the correct answer data. For example, an image of a packing form that can be determined to be in an abnormal state is prepared, and feature vectors at locations (for example, the areas E1, E2, and E3 in FIG. 5) that clearly indicate a feature of the abnormal state in the image are extracted. The feature vector extracted in this manner is used as a correct answer feature vector.

The feature vector acquisition unit 31 may use a convolutional neural network (CNN) as the machine learning model M2. Here, the feature vector acquisition unit 31 may perform machine learning using images acquired in time series as learning data, or may perform machine learning using images that are not in time series. For example, learning may be performed by preparing a large number of images that clearly show a feature of an abnormal state or a normal state of the packing forms. For example, the learning data consists of a data group of a plurality of "images I(i) and correct answer feature vectors z(i)" from "pattern 0" to "pattern N." In addition, the machine learning model M2 is not limited to the CNN as long as the feature vector acquisition unit 31 can acquire.

Figure 7:
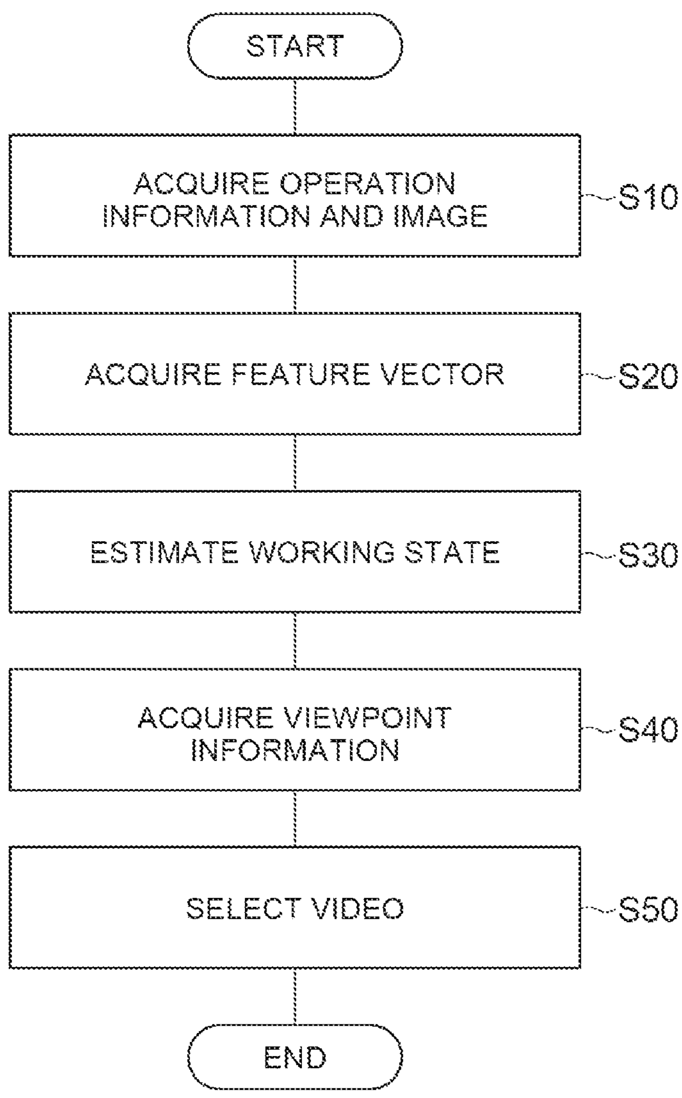
FIG. 7 is a flowchart illustrating processing content of the driving assistance system.

Next, an example of processing content showing a driving assistance method in the control device 20 will be described with reference to FIG. 7. The processing illustrated in FIG. 7 is performed when the driving assistance video is displayed on the display unit 17 and the operator is operating the forklift 1 through a remote operation. As illustrated in FIG. 7, the working state acquisition unit 23 acquires the operation information by the operator via the operation information acquisition unit 18, and acquires the image of the packing form via the display control unit 22 (step S10). Next, the feature vector acquisition unit acquires the feature vector on the basis of the image acquired in step S10 (step S20). Next, the working state estimation unit 30 estimates the working state on the basis of the operation information acquired in step S10 and the feature vector acquired in step S20 (step S30). Next, the viewpoint information acquisition unit 26 acquires the viewpoint information on the basis of the working state estimated in step S30 (step S40). Next, the display control unit 22 selects the driving assistance video to be displayed on the display unit 17 on the basis of the viewpoint information acquired in step S40 (step S50).

Next, operations and effects of the control device 20 according to the present embodiment will be described.

The control device 20 includes the working state estimation unit 30 that estimates the working state of the forklift 1. Here, the working state estimation unit 30 receives not only an input of the operation information regarding the operation state of the forklift 1, but also the photographing information obtained by photographing the package. The working state estimation unit 30 can determine whether the packing form of the package is normal or abnormal on the basis of not only the operation of the forklift 1, but also the imaging information. Therefore, the working state estimation unit 30 determines whether or not the packing form is in an abnormal state, and outputs the working state. This makes it possible for the working state estimation unit 30 to estimate the working state, including not only the state of the forklift 1 itself but also the abnormal state of the packing form. From the above, it is possible to estimate the working state of the forklift 1 more appropriately.

The working state estimation unit 30 can estimate the working state on the basis of the working state estimation model set by machine learning, and may output the working state on the basis of the operation information and the photographing information. Since the working state estimation model is set by machine learning on the basis of past actual data, it is possible to accurately estimate the working state, including the abnormal state of the packing form.

The operation information may include at least one of the accelerator operation amount, the steering angle, the lift operation amount, the reach operation amount, and the tilt operation amount. These parameters are parameters that reflect an intention of an operator in the forklift 1. The working state estimation unit 30 can perform estimation of an appropriate working state by using such parameters as the operation information.

The control device 20 may further include the feature vector acquisition unit 31 that acquires the feature vector from the image obtained by photographing the package, by using machine learning, the feature vector acquisition unit 31 may use the CNN as a machine learning model, and the working state estimation unit 30 may estimate the working state on the basis of the feature vector acquired by the feature vector acquisition unit 31. The feature vector acquisition unit 31 can reduce an amount of information to be output to the working state estimation unit 30 by indicating the photographing information using the feature vector. Further, the feature vector acquisition unit 31 can use the CNN as a machine learning model to acquire a feature vector that suitably reflects the abnormal state of the packing form on the basis of past performance.

Although some preferred embodiments of the present disclosure have been described above, the present disclosure is not limited to the above embodiments.

Although the driving assistance system assists work of an operator at the time of remote operation in the above-described embodiment, assistance may be performed when manned operation of an industrial vehicle is performed. Further, assistance when the operator performs simulation driving of the industrial vehicle may be performed.

The industrial vehicle is not limited to the forklift, and a towing tractor, a skid steer loader, or the like may be adopted.

In the above-described embodiment, the working state estimation unit 30 and the feature vector acquisition unit 31 have performed processing using the machine learning, but the machine learning may not be necessarily used.

[Mode 1]

A control device for an industrial vehicle for estimating a working state of the industrial vehicle, the control device including:

a working state estimation unit configured to estimate the working state of the industrial vehicle, wherein the working state estimation unit receives operation information regarding an operation state with respect to the industrial vehicle and photographing information obtained by photographing a package, performs a determination as to whether or not a packing form of the package is in an abnormal state, and outputs the working state.

[Mode 2]

The control device for an industrial vehicle according to mode 1, wherein the working state estimation unit is capable of estimating the working state on the basis of a working state estimation model set by machine learning, and outputs the working state on the basis of the operation information and the photographing information.

[Mode 3]

The control device for an industrial vehicle according to mode 1, wherein the operation information includes at least one of an accelerator operation amount, a steering angle, a lift operation amount, a reach operation amount, and a tilt operation amount.

[Mode 4]

The control device for an industrial vehicle according to any one of mode 1, further including:

a feature vector acquisition unit configured to acquire a feature vector of the image from an image obtained by photographing the package, by using machine learning, wherein the feature vector acquisition unit uses a CNN as a machine learning model, and the working state estimation unit estimates the working state on the basis of the feature vector acquired by the feature vector acquisition unit.

[Mode 5]

A control system for an industrial vehicle including the control device for an industrial vehicle according to any one of modes 1 to 4.

[Mode 6]

A program for a control device for an industrial vehicle used in the control device for an industrial vehicle according to any one of modes 1 to 4.

REFERENCE SIGNS LIST

1 Forklift
20 Control device
30 Working state estimation unit
31 Feature vector acquisition unit
100 Driving assistance system (control system for industrial vehicle).

What is claimed is:

1. A control device for an industrial vehicle, wherein the industrial vehicle is a forklift, the control device comprising:

a display unit;

one or more memories storing instructions; and a processor coupled to the one or more memories and configured to perform, based on the instructions, a method comprising:

estimating a working state of the forklift, wherein the estimating comprises:

receiving operation information regarding an operation state with respect to the forklift and photographic information obtained by photographing a package, wherein the photographic information includes at least one image, acquiring a working state estimation model corresponding to an operator operating the forklift, the working state estimation model including an estimation index set by machine learning based on a past driving performance of the operator operating the forklift, the estimation index defining a transition condition or a transition threshold for transitioning to each of a plurality of working states, collating the working state estimation model in which the estimation index has been set, with a working state input to estimate a working state, wherein the working state comprises travelling state information of the forklift and package work information of the forklift, determining, based on the at least one image and the working state estimated by the working state estimation model, whether or not a packing form of the package is in an abnormal state, wherein the abnormal state comprises the package bridging other packages, the package bridging between first and second pallets, or the package protruding from a third pallet, and outputting the working state on a remote operation device to assist an operator operating the forklift, thereby avoiding a collapse of the package, a fall of the package, or a collision of the package with a fourth pallet, wherein the display unit comprises a first screen and a second screen, a first video is presented on the first screen, wherein the first video is chosen by the processor according to the current working state, wherein a plurality of images from a plurality of photographic units on the forklift are shown in a reduced size on the second screen.

2. The control device according to claim 1, wherein the operation information includes at least one of an accelerator operation amount, a steering angle, a lift operation amount, a reach operation amount, and a tilt operation amount.

3. The control device according to claim 1, wherein the estimating further comprises:

acquiring a feature vector of the image from an image obtained by photographing the package, by using machine learning with a second machine learning model, wherein the second machine learning model is implemented as a convolutional neural network (CNN), and wherein the working state is estimated on the basis of the feature vector.

4. A control system for an industrial vehicle comprising the control device for an industrial vehicle according to claim 1.

5. A non-transitory computer readable medium storing a program for a control device for an industrial vehicle used in the control device for an industrial vehicle according to claim 1.

6. The control device according to claim 1, wherein the method performed by the processor, based on the instructions, further comprises acquiring, from a database stored in a storage unit, viewpoint information corresponding to the working state by collating the working state with the database, wherein the database stores each of the plurality of working states associated with a respective viewpoint captured by the plurality of photographic units provided at respective portions of the forklift, and wherein the first video is chosen by the processor according to a viewpoint from the database that corresponds to the current working state.

* * * * *